United States Patent [19]

Crivello et al.

[11] 4,026,705
[45] May 31, 1977

[54] PHOTOCURABLE COMPOSITIONS AND METHODS

[75] Inventors: James V. Crivello, Elnora; Siegfried H. Schroeter, Schenectady, both of N.Y.

[73] Assignee: General Electric Company, Schenectady, N.Y.

[22] Filed: May 2, 1975

[21] Appl. No.: 574,005

[52] U.S. Cl. .............................. 96/27 R; 96/115 P; 96/115 R; 204/159.18; 204/159.23; 204/159.24
[51] Int. Cl.² ...................... G03C 5/04; G03C 1/68; C08F 8/18; C08F 2/46
[58] Field of Search ............ 96/115 P, 115 R, 35.1, 96/27 R; 204/159.18, 159.23, 159.24; 260/2 EP, 2 EC, 47 EC, 47 EN

[56] References Cited

UNITED STATES PATENTS

| 3,567,453 | 3/1971 | Borden | 96/91 |
| 3,691,133 | 9/1972 | Sura | 260/47 EC |
| 3,729,313 | 4/1973 | Smith | 96/115 P |
| 3,808,006 | 4/1974 | Smith | 96/115 P |

OTHER PUBLICATIONS

Banks, Chemical Reviews vol. 66 No. 3 5/25/66 pp. 243–263.
Irving et al. Journal of Chem. Soc. (1960) pp. 2078–2081.

*Primary Examiner*—Jack P. Brammer
*Attorney, Agent, or Firm*—William A. Teoli; Joseph T. Cohen; Jerome C. Squillaro

[57] ABSTRACT

Epoxy compositions are provided which can be cured with visible radiant energy based on the use of certain organic dyes in combination with diarylhalonium salts. Cationic polymerization of various olefinic and cyclic organic compounds and organosilicon cyclics also can be effected in a similar manner.

13 Claims, No Drawings

PHOTOCURABLE COMPOSITIONS AND METHODS

The present invention relates to visible radiant energy curable epoxy resin compositions. The present invention also relates to a visible radiant energy method for polymerizing a variety of olefinic and cyclic organic compounds and organosilicon cyclics and to such polymerizable compositions.

Epoxy resins have generally been employed in a variety of applications requiring high performance materials. Cure of the epoxy resin can generally be achieved by two-package systems based on the incorporation into the resin of active amine containing compounds or carboxylic acid anhydrides. These systems require thorough mixing of the ingredients; in addition, cure time can be several hours.

As taught in copending application of James V. Crivello, Ser. No. 466,375 filed May 2, 1974 now abandoned, and assigned to the same assignee as the present invention, certain radiation sensitive aromatic halonium salts, such as compounds of the formula,

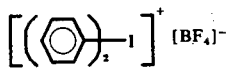

can be incorporated into epoxy resins to provide one-package radiation curable compositions.

The compositions of Crivello do not suffer from the disadvantages shown by Schlesinger U.S. Pat. No. 3,703,296 which require a stabilizer to minimize cure at ambient temperature in the dark. Although radiation sensitive at wavelengths of about 1849A to 3800A the photoinitiators of neither Crivello nor Schlesinger can be used satisfactorily under visible light which hereinafter will signify radiation of from 3800A to 8000A.

Photosensitive mixtures curable under visible light have been used in photoimaging systems as shown by Smith U.S. Pat. Nos. 3,729,313 and 3,808,006. As taught by Smith, certain dyes were found to produce free radicals with diphenyliodonium compounds when used in intimate admixture with such diphenyliodonium compounds, if such dyes were capable of sensitizing a compound such as 2-methyl-4,6-bis(trichloromethyl)-s-triazene. However, the photosensitive mixture taught by Smith were directed to the free radical polymerization of ethylenically unsaturated organic compounds, such as penaerythritol tetraacrylate.

An object of the present invention, therefore, is to develop a visible light cationic polymerization curing system, instead of a free radical polymerization curing system.

Another object of the present invention is to provide visible light curable epoxy compositions.

A further object of the present invention is to provide curable polymerizable compositions selected from cyclic organic compounds, olefins and organosilicon cyclics and a method for polymerizing such materials. Although a cationic polymerization method for the polymerization of such materials is shown in copending application Ser. No. 466,377 of James Crivello, filed May 2, 1974, now abandoned and assigned to the same assignee as the present invention, this method of Crivello is based on the use of ultraviolet light instead of visible light.

The present invention is based on the discovery that epoxy compositions, and a variety of cyclic organic compounds, olefins and organosilicon cyclics can be cationically cured or polymerized under visible light by the use of certain arylhalonium salts in combination with particular dyes, such as cationic dyes or basic dyes.

There is provided by the present invention, visible light curable epoxy compositions comprising by weight, A. an epoxy resin,
B. from 0.1% to 10% of (A) of a photoinitiator consisting essentially of a diarylhalonium salt, and
C. from 0.001% to 3% based on the weight of (A), of an organic dye capable of effecting the cure of (A) resulting from the photochemical release of a cationic polymerizaton catalyst when used in combination with (B), and exposed to visible radiation, where said dye is a member selected from the class consisting of cationic dyes and basic dyes.

There is also provided by the present invention, polymerizable compositions comprising, D. a monomeric or prepolymeric cationically polymerizable organic material free of oxirane oxygen selected from vinyl organic monomers, vinyl organic prepolymers, cyclic organic ethers, cyclic organic esters, cyclic organic sulfides and organosilicon cyclics, lactams and lactones,
E. from 0.1% to 10% of (D) of a photoinitiator consisting essentially of a diarylhalonium salt, and
F. from 0.001% to 3% based on the weight of (D) of an organic dye capable of effecting the polymerization of (D) resulting from the photochemical release of a cationic polymerization catalyst when used in combination with (E) and exposed to visible radiation where said dye is a member selected from the class consisting of cationic dyes and basic dyes.

Included among the above shown radiation sensitive aromatic halonium salts which can be used to make the curable compositions and the polymerizable compositions of the present invention are compounds of the formula, $$[(R)_a(R^1)_bX]_c^+ [MQ_d]^{-(d-e)} \qquad (1)$$

where R is a monovalent aromatic organic radical, $R^1$ is a divalent aromatic organic radical, X is a halogen radical such as I, Br, Cl, etc., M is a metal or metalloid and Q is a halogen radical such as Cl, F, Br, I, etc., a is a whole number equal to 0 or 2, b is a whole number equal to 0 or 1, the sum of $a$ 30 $b$ is equal to 2 or the valence of X, $c=d-e$ $e$=valence of M and is an integer equal to 2 to 7 inclusive, and $d$ is $>e$ and is an integer having a value up to 8.

Radicals included by R can be the same or different, aromatic carbocyclic or heterocyclic radical having from 6 to 20 carbon atoms, which can be substituted with from 1 to 4 monovalent radicals selected from $C_{(1-8)}$ alkoxy, $C_{(1-8)}$ alkyl, nitro, chloro, etc., R is more particularly, phenyl, chlorophenyl, nitrophenyl, methoxyphenyl, pyridyl, etc. Radicals included by $R^1$ are divalent radicals such as

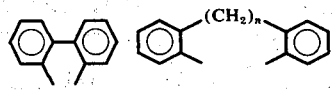

etc. Metal or metalloids included by M of formula 1 are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc. and metalloids such as B, P, As, etc. Complex anions included by $MQ_d^{-(d-e)}$ are, for example, $BF_4^-$, $PF_6^-$, $AsF_6^-$, $SbF_6^-$, $FeCl_4^=$, $SnCl_6^=$, $SbCl_6^-$, $BiCl_5^=$, etc.

Halonium salts included by formula 1 are, for example,

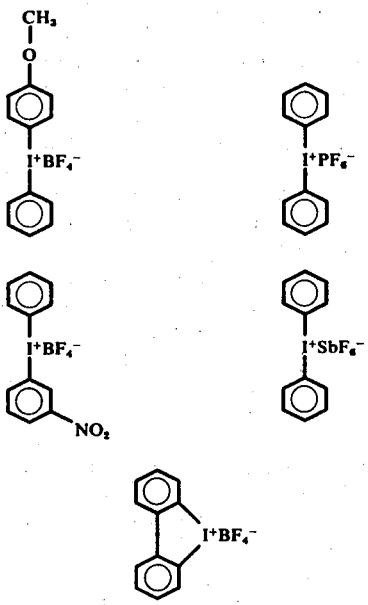

The halonium salts of formula 1 are well known and can be made by the procedures described by O. A. Ptitsyna, M. E. Pudecva, et al., Dokl, Adad Nauk, SSSR, 163, 383 (1965); Dokl, Chem., 163, 671 (1965). F. Marshall Beringer, M. Drexler, E. M. Gindler, J. Am. Chem. Soc., 75, 2705 (1953). J. Collette, D. McGreer, R. Crawford, et al., J. Am. Chem. Soc. 78, 3819 (1956).

Dyes which can be used in combination with the above identified arylhalonium salts in the practice of the invention are cationic dyes, such as shown in Vol. 20, p. 194-7 of the Kirk-Othmer Encyclopedia, 2nd Edition, 1965, John Wiley & Sons, New York. Some of the cationic dyes which can be used are, for example, Acridine orange; C.I. 46005
Acridine yellow; C.I. 46035
Phosphine R; C.I. 46045
Benzoflavin; C.I. 46065
Setoflavin T; C.I. 49005.

In addition to the above, basic dyes can also be used. Some of these basic dyes are shown in Vol. 7, p. 532-4 of Kirk-Othmer Encyclopedia, as cited above and include Haematoporphyrin
4,4'-bisdimethylaminobenzophenone
4,4'-bisdiethylaminobenzophenone.

In addition to the above, a combination of dyes also can be used to sensitize the decomposition of diarylidonium salts to the complete visible spectrum. It has been found that this procedure results in better use of the energy available from visible light sources and also increases the rate of cure.

The term "epoxy resin" as utilized in the description of the curable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or from the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins which can be used are shown in the Encyclopedia of Polymer Science and Technology, Vol. 6, 1967, Interscience Publishers, New York, pp 209-271.

Curable compositions of the present invention can be made by blending the epoxy resin, which hereinafter will signify epoxy monomer, epoxy prepolymer, oxirane containing organic polymers or a mixture thereof, with an effective amount of the halonium salt and the dye, which hereinafter will signify either cationic dye, basic dye or mixture thereof. The resulting curable composition which can be in the form of a varnish having a viscosity of from 1 centipoise to 100,000 centipoises at 25° C can be applied to a variety of substrates by conventional means and cured to the tack-free state within 1 second or less to 10 minutes or more. In other instances, where the epoxy resin is a solid, the curable composition can be a free flowing powder.

Depending upon the compatability of the halonium salt or dye with the epoxy resin, an organic solvent such as nitromethane, acetone, acetonitrile, etc., can be used. In instances where the epoxy resin is a solid, incorporation can be achieved by dry milling or by melt mixing. In situ preparation of the halonium salt by separate or simultaneous incorporation of halonium salt of the formula $$[(R)_a(R^1)_bX]^+ [Q']^-$$

where R, $R^1$, X, a and b are as previously defined, and Q' is an anion such as $Cl^-$, $Br^-$, $F^-$, $I^-$, $HSO_4^-$, $CH_3SO_4^-$, $NO_3^-$, etc. with the salt of a Lewis Acid of the formula, $$M'[MQ]$$

also has been found to be effective, where [MQ] is as defined above and M′ is a metal cation such as Na⁺, K⁺, Li⁺, C⁺⁺, Mg⁺⁺, Ni⁺⁺, Co⁺⁺, Zn⁺⁺. M′ also can be an organic cation such as ammonium group, pyridinium group, etc. Examples of M′[MQ] are $NaBF_4$, $KAsF_6$, $NaSbF_6$, $KPF_6$.

Experience has shown that the proportion of halonium salt to the epoxy resin can vary widely inasmuch as the salt is substantially inert, unless activated. Effective results can be achieved, for example, if a proportion of from 0.1% to 15% by weight of halonium salt is employed, based on the weight of curable composition. Higher or lower amounts can be used, however, depending upon factors such as the nature of epoxy resin, intensity of radiation, cure time desired, etc. In addition, the proportions of the dye also can vary as previously indicated.

The curable compositions may contain inactive ingredients such as inorganic fillers, dyes, pigments, extenders, viscosity control agents, process aids, UV-screens, etc. in amounts of up to 100 parts filler per 100 of epoxy resin. The curable compositions can be applied to such substrates as metal, rubber, plastic, molded parts or films, paper, wood, glass cloth, concrete, ceramic, etc.

Some of the applications in which the curable compositions of the present invention can be used are, for example, protective, decorative and insulating coatings, potting compounds, printing inks, sealants, adhesives, photoresists, wire insulation, textile coatings, laminates, impregnated tapes, printing plates, etc.

Cure of the epoxy composition can be achieved by activating the halonium salt to provide the release of the Lewis Acid catalyst. Activation of the halonium salt can be achieved by exposing the curable composition to visible radiant energy such as tungsten light, daylight or fluorescent light. Cure of the compositions is preferably achieved by the use of tungsten light having a wavelength of from 3800 A to 8000 A and an intensity of at least from 100 to 1,000 watts. The lamp systems useful in the practice of the invention can consist of commercially available tungsten filament light bulbs, carbon arc lamps, fluorescent lamps, mercury vapor lamps, etc.

Included by the vinyl organic monomers which can be used in the practice of the invention to make polymerizable compositions which are convertible to thermoplastic polymers are, for example, styrene, vinyl acetamide, α-methyl styrene, isobutyl vinylether, n-octyl vinylether, acrolein, 1,1-diphenylethylene, β-pinene; vinyl arenes such as 4vinyl biphenyl, 1-vinyl pyrene, 2-vinyl fluorene, acenapthylene, 1 and 2-vinyl napthylene; 9-vinyl carbazole, vinyl pyrrolidone, 3-methyl-1-butene; vinyl cycloaliphatics such as vinylcyclohexane, vinylcyclopropane, 1-phenyvinylcyclopropane; dienes such as isobutylene, isoprene, butadiene, 1,4-pentadiene, etc.

Some of the vinyl organic prepolymers which can be used to make the polymerizable compositions of the present invention are, for example, $CH_2=CH-O-(CH_2O)_n-CH=CH_2$, where n is a positive integer having a value up to about 1000 or higher; multi-functional vinylethers, such as 1,2,3-propane trivinyl ether, trimethylolpropane trivinyl ether, prepolymers having the formula,

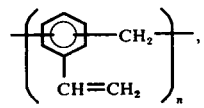

and low molecular weight polybutadiene having a viscosity of from 200 to 10,000 centipoises at 25° C., etc. Products resulting from the cure of such compositions can be used as potting resins, crosslinked coatings, printing inks and other applications typical of thermosetting or network resins.

A further category of the organic materials which can be used to make the polymerizable compositions are cyclic ethers which are convertible to thermoplastics. Included by such cyclic ethers are, for example, oxetanes such as 3,3-bis-chloromethyloxetane alkoxyoxetanes as shown by Schroeter Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers, there are also included cyclic esters such as β-lactones, for example, propiolactone, cyclic amines, such as 1,3,3-trimethylazetidine and organosilicone cyclics, for example,

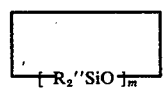

where R″ can be the same or different monovalent organic radicals such as methyl or phenyl and m is an integer equal to 3 to 8 inclusive. An example of an organosilicon cyclic is hexamethyl trisiloxane, octamethyl tetrasiloxane, etc. The products made in accordance with the present invention are high molecular weight oils and gums.

The polymerizable compositions may contain inactive ingredients such as silica fillers, dyes, extenders, viscosity control agents, process aids, etc. in amounts up to 100 parts filler per 100 parts of organic material.

In order that those skilled in the art will be better able to practice the invention, the following examples are given by way of illustration and not by way of limitation. All parts are by weight.

The diarylhalonium salts used in the following examples are made by procedures shown in copending application Ser. No. 574,007, now U.S. Pat. No. 3,981,897 of James V. Crivello filed concurrently herewith and assigned to the same assignee as the present invention. For example, the preparation of 4,4′-dimethyldiphenyliodonium hexafluoroarsenate is as follows:

A solution of about 200 parts of sulfuric acid in about 300 parts of acetic was added at a temperature between 0° to 3° C to a mixture, while it was being agitated, of 200 parts of potassium iodate, about 300 parts of toluene, about 900 parts of acetic acid and about 400 parts of acetic anhydride. The mixture was then stirred for 11 hours after all of the sulfuric acid and the acetic acid had been added. The resulting inorganic salts were removed by filtration and then washed with a small amount of cold glacial acetic acid. A pale yellow solution was obtained which was diluted to twice its volume with water and extracted three times with ether. A small amount (0.3 part) of sodium sulfide was added as a reducing agent.

Based on method of preparation, there was obtained a quantitative yield of 4,4′-dimethyldiphenyliodonium bisulfate. A slightly warm aqueous solution of substantially equal molar amounts of 4,4'-dimethyldiphenyliodonium bisulfate and potassium hexafluoroarsenate was allowed to cool. There was obtained a white crystalline deposit. The product was filtered and washed with distilled water. A second crop of crystals was obtained on further standing. After the crystals were dried overnight, there was obtained 27 parts of a product having a melting point of 148°–152° C. Recrystallization of the product from a water-ethanol mixture resulted in a product having a melting point of 163°–166° C. Based on method of preparation and NMR spectra and elemental analysis for $C_{14}H_{14}IAsF_6$ (calculated: percent C, 33.74; percent H, 2.81; percent As, 15.06; found: percent C, 33.70; percent H, 2.92; percent As, 15.28), the product was 4,4'-dimethyldiphenyliodonium hexafluoroarsenate.

EXAMPLE 1

A solution consisting of 70 parts by weight of an epoxy-novalac, Dow D.E.N. 431, and 30 parts by weight 4-vinylcyclohexene dioxide were mixed with 3 parts 4,4'-dimethyldiphenyliodonium hexafluoroarsenate and 0.2 parts acridine orange dye. Several experiments were carried out using this mixture.

A. A drop of the above mixture was placed between two glass slides and the slides irradiated using a GE photoflood lamp at a distance of approximately 3 inches. There was formed a rigid glass to glass bond in 15 seconds irradiation. Attempts to test the adhesive bond resulted in breakage of the glass rather than failure at the site of the bond.

B. Another portion of the above solution was applied to silicon steel as a 0.3 mil coating. After 15 seconds irradiation as described previously, a hard cured coating was produced.

EXAMPLE 2

Solutions were prepared as described in Example 1 using the following dyes: acridine orange, acridine yellow and Michler's ketone. Portions of these coatings were applied as 5 to 10 mils films to glass plates. The plates were then exposed to direct sunlight. The cure rates for the solutions containing the respective dyes were: acridine orange — 30 seconds, acridine yellow — 30 seconds; Michler's ketone — 60 seconds. After the indicated exposures, the films were completely tack-free and hard.

EXAMPLE 3

Two methods of photoimaging were tested using dye sensitized epoxy solutions.

A. To a 70:30 mixture of D.E.N.-431 and 4-vinylcyclohexene dioxide were added 3% by weight 4,4'-di-t-butyldiphenyliodonium hexafluoroarsenate and 0.2% acridine orange. A 1 mil film was drawn on a glass plate and then a 0.5 mil film of polypropylene was placed over the liquid epoxy. A mask consisting of a glass plate with fine printing on one side was placed on top of the polypropylene. The assembly was irradiated using a GE photoflood lamp for 45 seconds at a distance of 4 inches. Next, the mask was removed and the polypropylene layer peeled off revealing a very clear sharp incised image.

B. Alternatively, the solution described above is coated onto a glass plate. Then the glass mask which has been coated with silicone lubricant and release agent is placed directly onto the liquid epoxy. After irradiation, the mask was removed and the epoxy film was washed with toluene to remove the unexposed portions. A clear incised photoimage resulted.

EXAMPLE 4

A mixture composed of 70% Dow epoxy-novalac D.E.N.-431 and 30% 4-vinylcyclohexane dioxide was mixed with 3% 4,4'-dimethyldiphenyliodonium hexafluoroarsenate and 0.3% acridine orange. The sensitized solution was spread on glass plates and exposed for 10 minutes to a 150 W incandescent lamp. Following the irradiation, the films were found to be cured hard and tack-free.

EXAMPLE 5

In the following examples, the efficiency of various dyes were evaluated for 3% solutions of the indicated iodonium salt in a 70% Dow epoxy-novalac D.E.N.-431 and 30% 4-vinylcyclohexane dioxide. To each of the epoxy mixtures were added 0.2% of the dyes listed in Table I. The samples were irradiated using a GE DXC RFL-2 incandescent 500 W photoflood lamp at a distance of 4 inches from the lamp. The effective intensity of illumination was approximately 20,000 foot-candles. "Cure or gel" times were interpreted as the length of time of illumination required for the films to become tack-free.

TABLE I

| | Iodinium Salt | Dye | Cure Time (sec) |
|---|---|---|---|
| I. | 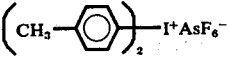 | None<br>Acridine Orange<br>Acridine Yellow<br>Haematoporphrin<br>Michler's Ketone<br>Benzoflavin | >120<br>20<br>30<br>60<br>40<br>15 |
| II. | 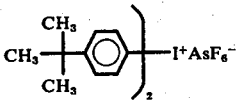 | None<br>Acridine Orange<br>Acridine Yellow<br>Haematoporphrin<br>Michler's Ketone<br>Benzoflavin | >120<br>30<br>40<br>90<br>60<br>20 |
| III. | 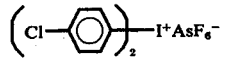 | None<br>Acridine Orange<br>Acridine Yellow<br>Haematoporphrin<br>Michler's Ketone<br>Benzoflavin | >120<br>20<br>20<br>90<br>50<br>15 |
| IV. | 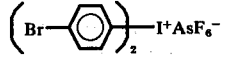 | None<br>Acridine Orange<br>Acridine Yellow<br>Haematoprophrin<br>Michler's Ketone<br>Benzoflavin | >120<br>15<br>25<br>75<br>45<br>15 |

EXAMPLE 6

In table II are contained data in which we recorded the times required to cure 3 mil films of the same epoxy mixture as described in the previous example. In this study 3% by weight of the indicated diaryliodonium salt and 0.2% of acridine orange were used. Irradiation was performed as described in the previous example.

TABLE II

| Iodonium Cation | Anion | Cure Time (sec) |
|---|---|---|
| $(CH_3-\bigcirc)_2-I^+$ | $BF_4^-$ | 90 |
| " | $PF_6^-$ | 30 |
| " | $AsF_6^-$ | 20 |

TABLE II-continued

| Iodonium Cation | Anion | Cure Time (sec) |
|---|---|---|
|  | $BF_4^-$ | 90 |
| " | $PF_6^-$ | 30 |
| " | $AsF_6^-$ | 30 |
| " | $SbF_6^-$ | 20 |

EXAMPLE 7

The following were combined together: 100 parts 4-vinylcyclohexene oxide, 3 parts 4,4'-dimethyldiphenyliodonium hexafluoroarsenate, 0.15 parts acridine orange and 0.15 part benzoflavin. This mixture was thoroughly mixed together and then coated onto steel to give a 1 mil coating. Irradiation for 15 seconds with a GE EBR 375 W lamp gave a hard cured coating.

The above mixture was used to impregnated glass cloth which was cut into squares and a two ply laminate was made. Irradiation as described above for 40 seconds per side gave a rigid bonded composite.

EXAMPLE 8

A mixture composed of 100 parts diethyleneglycol divinyl ether, 3 parts 4,4'-diisopropyldiphenyliodonium hexafluoroarsenate and 0.3 parts 4,4'-bisdimethylaminobenzophenone (Michler's Ketone) were cured using a GE EBR 375 W incandescent lamp at a distance of 6 inches. The cure time which was recorded was 20 seconds.

EXAMPLE 9

The procedure of Example 8 was repeated in all details except that 0.3 parts haematoporphyrin was used in place of Michler's Ketone. This mixture required 50 seconds irradiation to become tack-free.

EXAMPLE 10

A mixture of 9.2 parts of recrystallized trioxane, 26 parts of methylene chloride, 0.06 part of 4,4'-diisopropyldiphenyliodonium tetrafluoroborate and 0.01 part benzoflavin was irradiated for 1 hour in the presence of a GE 650 W DWY projector lamp. A white powdery precipitate was formed. The solution was allowed to stand in the dark for 8 hours. The reaction mixture was then poured into methanol containing a small amount of ammonium hydroxide. After washing, filtering and drying the polymer, there was obtained 7 parts of polyoxymethylene.

EXAMPLE 11

A mixture of 11.4 parts of α-methylstyrene, 0.11 parts of 4,4'-di-t-butyldiphenyliodonium hexafluoroarsenate, 0.01 parts of benzoflavin and 26 parts methylene chloride was irradiated for 2.5 hours as described in the previous example. The resulting highly viscous polymer solution was quenched by adding a small amount of ammoniacal methanol. The polymer was isolated by pouring the solution into a large amount of methanol. After drying, there was obtained 12 parts of poly-α-methylstyrene.

Although the above examples are limited to only a few of the very many compositions of the present invention comprising arylhalonium salts, organic dyes and polymerizable organic materials, it should be understood that the compositions of the present invention broadly comprise visible light materials included by the description preceding these examples.

What I claim as new and desire to secure by Letters Patent of the United States is:

1. A visible light curable epoxy resin composition consisting essentially of by weight
   A. an epoxy resin,
   B. from 0.1% to 10% of (A) of a photoinitiator consisting essentially of an aryliodonium salt of the formula, $$\left[(R)_a(R^1)_b I\right]_c^+ \left[MQ_d\right]^{-(d-e)}, \text{ and}$$

C. from 0.001% to 3%, based on the weight of (A), of a cationic dye, selected from the class consisting of Acridine orange, Acridine yellow, Phosphine R, Benxoflavin and Setoflavin T, where R is a monovalent aromatic organic radical, $R^1$ is a divalent aromatic organic radical, M is a metal or metalloid and Q is a halogen radical, $a$ is a whole number equal to 0 or 2, $b$ is a whole number equal to 0 or 1, the sum of $a + b$ is equal to 2 or the valence of I,
$c = d - e$
$e$ = valence of M and is an integer equal to 2 to 7 inclusive, and
$d > e$ and is an integer having a value up to 8.

2. A composition as in claim 1, where the photoinitiator is diphenyliodonium hexafluorophosphate.

3. A composition as in claim 1, where the photoinitiator is di-4,4'-dimethyldiphenyliodonium hexafluoroarsenate.

4. A composition as in claim 1, where the organic dye is acridine orange.

5. A composition as in claim 1, where the organic dye is acridine yellow.

6. A composition as in claim 1, where the organic dye is a mixture of acridine orange and benzoflavin.

7. A visible light polymerizable composition consisting essentially of
   D. a cationically polymerizable organic material, selected from the class consisting of cyclic organic esters, cyclic organic sulfides, organosilicon cyclics, lactams and lactones,
   E. from 0.1% to 10% of (D) of a photoinitiator consisting essentially of an aryliodonium salt of the formula,

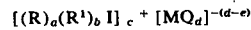

where R is a monovalent aromatic organic radical, $R^1$ is a divalent aromatic organic radical, M is a metal or metalloid and Q is a halogen radical, $a$ is a whole number equal to 0 or 2, $b$ is a whole number equal to 0 or 1, the sum of $a + b$ is equal to 2 or the valence of I,
$c = d - e$
$e$ = valence of M and is an integer equal to 2 to 7 inclusive, and
d e and is an integer having a value up to 8, and
   F. from 0.001% to 3%, based on the weight of (D) of a cationic dye, selected from the class consisting of Acridine orange, Acridine yellow Phosphine R, Benzoflavin and Setoflavin T.

8. A polymerizable composition in accordance with claim 7, wherein the photoinitiator is diphenyliodonium tetrafluoroborate.

9. A polymerizable composition in accordance with claim 7, where the photoinitiator is di-4,4'-dimethyldiphenyliodonium hexafluoroarsenate.

10. A polymerizable composition in accordance with claim 7, employing α-methylstyrene as the vinyl organic compound.

11. A polymerizable composition in accordance with claim 7, where the cyclic organic compound is trioxane.

12. A composite structure made with the visible light curable composition of claim 7.

13. A polymerization method comprising exposing the composition of claim 7 to visible light.

* * * * *

Notice of Adverse Decision in Interference

In Interference No. 100,337, involving Patent No. 4,026,705, J. V. Crivello and S. H. Schroeter, PHOTO CURABLE COMPOSITION AND METHODS, final judgment adverse to the patentees was rendered Apr. 1, 1982, as to claims 1, 2 and 4.

*[Official Gazette October 19, 1982.]*